Nov. 24, 1970 G. KOHLER ET AL 3,542,967

CONTROL OF PATH CONNECTIONS IN A TELEPHONE SWITCHING SYSTEM

Filed June 29, 1966

3,542,967

CONTROL OF PATH CONNECTIONS IN A TELEPHONE SWITCHING SYSTEM

Gerhard Kohler, Stuttgart-Weilimdorf, Nikolaus Lewen, Tamm, and Anton Pfau, Stuttgart-Zuffenhausen, Germany, assignors to International Standard Electric Corporation, New York, N.Y., a corporation of Delaware Filed June 29, 1966, Ser. No. 561,421
Claims priority, application Germany, July 1, 1965, St 24,063
Int. Cl. H04q 3/42
U.S. Cl. 179—18 3 Claims

ABSTRACT OF THE DISCLOSURE

In a guide wire switching system an arrangement is provided to select and block an available output which is one of a number of available outputs connected in multiple. The selection and blocking are performed immediately before a connection is to be established between the output and an input. The blocking prevents one of the other available outputs from being seized after the one has been selected.

Figures 1, 2:
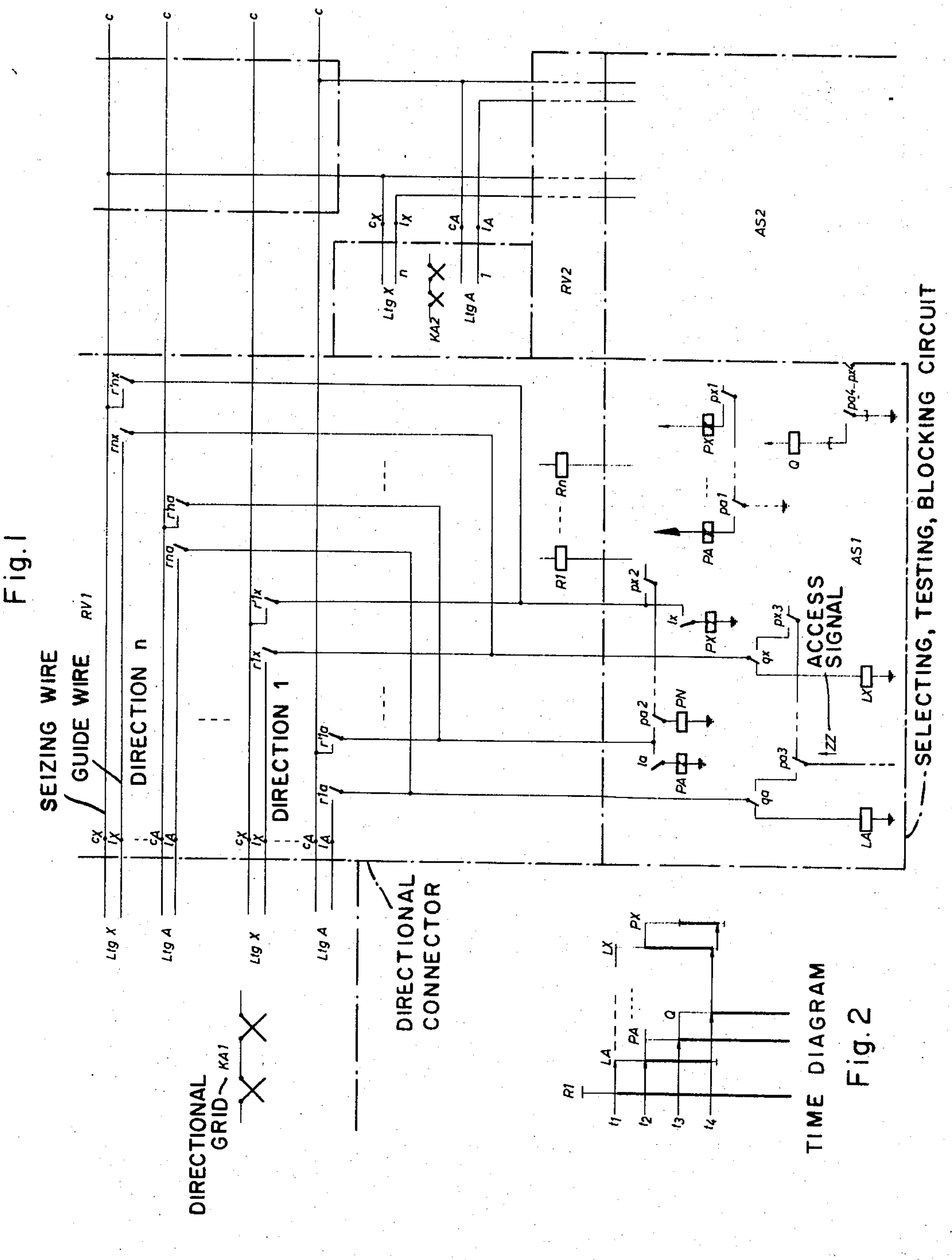

The invention relates to control of the establishment of a connection in telecommunication, particularly telephone exchange systems with a plurality of crosspoint arrangements, the outputs of which are connected in a multiple and to which are associated central control elements to carry out conjugated selection in such a way, that in each crosspoint arrangement only one connection can be established at a time.

In conjugatedly controlled crosspoint arrangements possessing a route searching network, separated from the crosspoint arrangement, only one connection is conventionally established at a time. From the article by H. Schönemeyer, "Das Leitaderverfahren als Mittel zur Wegesuche in mehrstufigen Koppelnetzen," (the guide wire method as a means for route search in multi-stage switching networks), in the SEL-News, 11th year of publication, 1963, vol. 3, pages 109 to 113, it is known to transmit an "offering signal" through the route searching network in such a crosspoint ararngement to establish a connection from all outputs that can be seized. On the input end an "access signal" is led to the input of the route searching network, connectable with a seizeable output, having been marked as such by the "offering signal," and a connecting path, leading from said input to an output, is selected piece by piece (from switching stage to switching stage) in that always one route piece, i.e. the route search wire bearing said "access signal," is seized.

Thereby one of the seizable outputs is reached finally, the connecting path is through-connected, and the output blocked against further seizure by applying potential to the seizing wire. The entire connection is controlled by control elements (markers) associated with the crosspoint arrangement.

No difficulties occur during the period between testing for availability of seizable outputs and the blocking of an output, because, at a time, only one connection will be established. An output marked as being seizable can therefore not be seized by another connection during said period.

There is, however, a difference, if the outputs of various crosspoint arrangements are connected in multiple. Whereas in each crosspoint arrangement a connection can be established at the same time under the control of the respectively associated control elements, it might be possible that an output, having been marked as seizable, is seized by another crosspoint arrangement prior to its blocking. Consequently, this known method is unsuitable to carry out a conjugated selection in a crosspoint ararngement, the outputs of which are connected in multiples with the outputs of other crosspoint arrangements.

It is the object of the invention to provide a method enabling such a conjugated selection.

The method according to the invention consists in that one of the outputs, corresponding to a direction desired, and being available and reachable from a defined input of a crosspoint arrangement, is selected and blocked against further seizings simultaneously before a connection is going to be established between said output and the input.

In a further embodiment of the invention selection and blocking of an output are carried out through a circuit, associated in common with all outputs of a crosspoint arrangement, which circuit is connected with all outputs of a crosspoint arrangement corresponding to the direction desired through a connecting facility.

The invention is now in detail explained with the aid of the accompanying drawings. In FIG. 1 KA1 and KA2 indicate two crosspoint arrangements used as directional grids, their outputs being connected in a multiple (shown in the drawing only for the c-wires of some output lines).

The directional grids render access to *n* directions (direction 1 to direction *n*), whereby several output lines correspond to each direction. FIG. 1 only shows the lines L*tg* A and L*tg* X of the first and of the *n*th direction for the directional grid KA1 and the line L*tg* A of the first and the line L*tg* X of the *n*th direction for the directional grid KA2.

A route searching network, consisting of guide wires, led in parallel to the speech wires, is associated with each directional grid and central control elements (not shown on the drawing) to carry out a conjugated selection. In each directional grid only one connection can be established at a time, but a connection in the directional grid KA1 can be established simultaneously with the establishment of a connection in the directional grid KA2.

To initiate the establishment of a connection between a defined input of a directional grid, e.g. of KA1, and an output corresponding to a defined direction, e.g. direction 1, an "offering signal" is led to the guide wire corresponding to the input, and, on the other hand, the relay R1 is caused to respond.

Relay R1 is provided in a directional connector RV1, associated with the directional grid KA1 (an equal directional connector KV2 is associated to the directional grid KA2) and said relay is caused to respond, if a connection in the direction 1 is desired. A relay R is also associated to each other direction, but in the drawing only the relays R1 and R*n* are shown, associated with the directions 1 and *n*.

Relay R1 closes its contacts *r*1*a* to *r*1*x* and *r'*1*a* to *r'*1*x*, thereby connecting the guide wires $l_A$ to $l_x$ and the seizing wires $c_A$ to $c_X$ from the output line L*tg* A to L*tg* X corresponding to the direction 1 with a selecting, testing and blocking circuit AS1, also associated with the directional grid KA1. (A similar circuit, marked AS2, is associated with the directional grid KA2.)

Through the contacts *r*1*a* to *r*1*x* each of the guide wires $l_A$ to $l_X$ is connected with a relay LA to LX in the circuit AS1. Offering signals appear on the guide wires having output terminals on which a connection with the input, marked by the "access signal," is possible. The guide wires are connected with a relay LA . . . LX in the circuit AS1 through the directional connector RV1, and the corresponding relays, e.g. relay LA and LX respond. Through the now closed contacts *la* and *lx* and the closed contacts *r*'1*a* and *r*'1*x* of relay R1 the windings I of the test relays PA and PX are connected with the seizing wires $c_A$ and $c_X$ of the output lines L*tg*A and L*tg*X of direction 1, marked by the "offering signal."

For each of the other lines a relay P is provided, too, but not shown on the drawing.

A testing of the busy status is now made at the output lines D*tg*A and L*tg*X of the desired direction 1 by means of the relays PA and PX. If both lines are available, both relays (PA and PX) respond to form holding circuits through their contacts *pa*1 and *px*1 and their windings II. The contacts *pa*1 and *px*1 of all P-relays form a blocking chain, which prevents more than one P relay from forming a holding circuit. In our example only the relay PA is held energized, after the "offering signal" on the guide wires $l_A$ and $l_X$ has ceased, the contact *pa*1 of said relay interrupting the holding circuit for relay PX.

Ground as busy status potential is now applied to the wire $c_A$ of the line L*tg*A through contact *pa*2 via the low-ohmic winding of a relay PN. This output line selected by the response of relay PA is thus blocked against any further seizing by the directional grid KA2 and the connection between the marked input of the directional grid KA1 and the line L*tg*A of the direction 1 can be established. To this end an "access signal" ZZ of the guide wire $l_A$ is applied to the selected and blocked output line L*tg*A (direction 1) via contact *pa*3 of relay PA and a contact *qa* of a relay Q which relay has responded after the contact *pa*4 has closed. With the aid of this signal a connecting path is selected in the direction to the input and then through-connected. Since such a connecting path is available (the "offering signal" appeared on the guide wire of this output line) and since this output line was available (testing with relay PA) and as it cannot be blocked from another side during the further establishment of the connection (blocked by busy potential applied to wire $c_A$), it is guaranteed that the connecting path can be established.

After the connecting path has been through-connected relay R1 of the directional grid RV1 is de-energized in a way not shown in detail and, consequently, the selecting, testing and blocking circuit is released.

In FIG. 2 of the drawings the switching processes, described above, are once more represented with the aid of a time diagram.

At the moment $t_1$ relay R1 responds and connects the wire $l_A$ of the line L*tga*A (direction 1) with the relay LA. At the moment $t_2$ relay LA responds because the "offering signal" appears on the wire $l_A$. At the moment $t_3$ relay PA responds (via contact *la*), and at the moment $t_4$ relay Q responds (via contact *pa*4). At the moment $t_2$ relay LX has responded, too, and consequently at moment $t_3$ also the relay PX, but for the latter relay no holding circuit is closed after the "offering signal" has ceased (relays LA and LX drop), and said relay PX draps, too. Only the relays R1, PA and Q remain operative. Therefore the line L*tg*A (direction 1) is selected, blocked against further seizings and the wire $l_A$ of said line receives the "access signal" (ZZ).

We claim:

1. An automatic switching system comprising a plurality of networks connected in tandem, control means for controlling the extension of switch paths one-at-time between first and second networks, the first network including a selected input and the second network including a group of outputs connected in multiple, the control means responding to signals calling for an extension of a switch path from the input to a first one of the outputs to block the remainder of the outputs against seizure, and the control means thereafter establishing a path from the input to the first one of said outputs.

2. The system of claim 1 wherein said control means is common to all outlets of said system.

3. The system of claim 1 wherein there are a plurality of said control means, said switch paths are extended through said system in a plurality of directions, and each of said control means is individually associated with switch paths extended through said networks.

References Cited

UNITED STATES PATENTS

| | | | |
|---|---|---|---|
| 3,280,267 | 10/1966 | Feucht | 179—18 |
| 3,342,947 | 9/1967 | Bock | 179—18 |
| 3,349,189 | 10/1967 | Van Bosse | 179—18 |
| 3,443,043 | 5/1969 | Schonemeyer et al. | 179—18 |

KATHLEEN H. CLAFFY, Primary Examiner

W. A. HELVESTINE, Assistant Examiner